(12) United States Patent
Rovoletto

(10) Patent No.: US 11,644,054 B2
(45) Date of Patent: May 9, 2023

(54) JOINING DEVICE BETWEEN COMPONENTS OF AN ITEM OF FURNITURE

(71) Applicant: CAR S.r.l., Padua (IT)

(72) Inventor: Stefano Rovoletto, Padua (IT)

(73) Assignee: CAR S.R.L., Padua (IT)

( * ) Notice: Subject to any disclaimer, the term of this patent is extended or adjusted under 35 U.S.C. 154(b) by 808 days.

(21) Appl. No.: 16/492,775

(22) PCT Filed: Dec. 21, 2017

(86) PCT No.: PCT/IB2017/058265
§ 371 (c)(1),
(2) Date: Sep. 10, 2019

(87) PCT Pub. No.: WO2018/167554
PCT Pub. Date: Sep. 20, 2018

(65) Prior Publication Data
US 2020/0072269 A1 Mar. 5, 2020

(30) Foreign Application Priority Data
Mar. 15, 2017 (IT) .................. 102017000028685

(51) Int. Cl.
*F16B 12/20* (2006.01)
*A47B 96/06* (2006.01)
(Continued)

(52) U.S. Cl.
CPC ........ *F16B 12/2036* (2013.01); *A47B 96/066* (2013.01); *A47B 2095/006* (2013.01); *A47B 2230/0033* (2013.01); *F16B 2012/103* (2013.01)

(58) Field of Classification Search
CPC .. F16B 12/20; F16B 12/2027; F16B 12/2036; F16B 2012/103; F16B 13/068; A47B 2095/006; A47B 2230/0033
See application file for complete search history.

(56) References Cited

U.S. PATENT DOCUMENTS 6,148,569 A * 11/2000 Giovannetti ............ F16B 7/046
403/231
7,207,757 B2 * 4/2007 Mengel .................. F16B 13/06
411/24

FOREIGN PATENT DOCUMENTS

DE 29804267 U1 7/1999
EP 0 949 424 * 10/1999 .............. F16B 12/20
(Continued)

OTHER PUBLICATIONS

International Search Report and Written Opinion dated Feb. 14, 2018 for counterpart International Patent Application No. PCT/IB2017/058265.

*Primary Examiner* — Michael P Ferguson
(74) *Attorney, Agent, or Firm* — Shuttleworth & Ingersoll, PLC; Timothy Klima

(57) ABSTRACT

A joining device between components of an item of furniture, including a casing having a first and a second radially expandable portion for engaging the components of the item of furniture, a tie-rod housed inside the casing and axially slidable, and a cam element housed in said casing for axially displacing the tie-rod from the rest position to the locking position and vice-versa. According to the present invention, the cam element has a lobe along its outer periphery which has a forward profile having a predefined extension about the axis of rotation such as to perform, alone, the displacement of the tie-rod with respect to the casing from the rest position to the locking position so as to actuate the expansion of both portions with a single movement according to (Continued)

a forward rotation direction of the cam element and any return through a movement according to a return rotation direction.

19 Claims, 18 Drawing Sheets

(51) Int. Cl.
*F16B 12/10* (2006.01)
*A47B 95/00* (2006.01)

(56) References Cited

FOREIGN PATENT DOCUMENTS

| WO | 2016055218 A1 | 4/2016 |
| WO | 2016199015 A1 | 12/2016 |

* cited by examiner

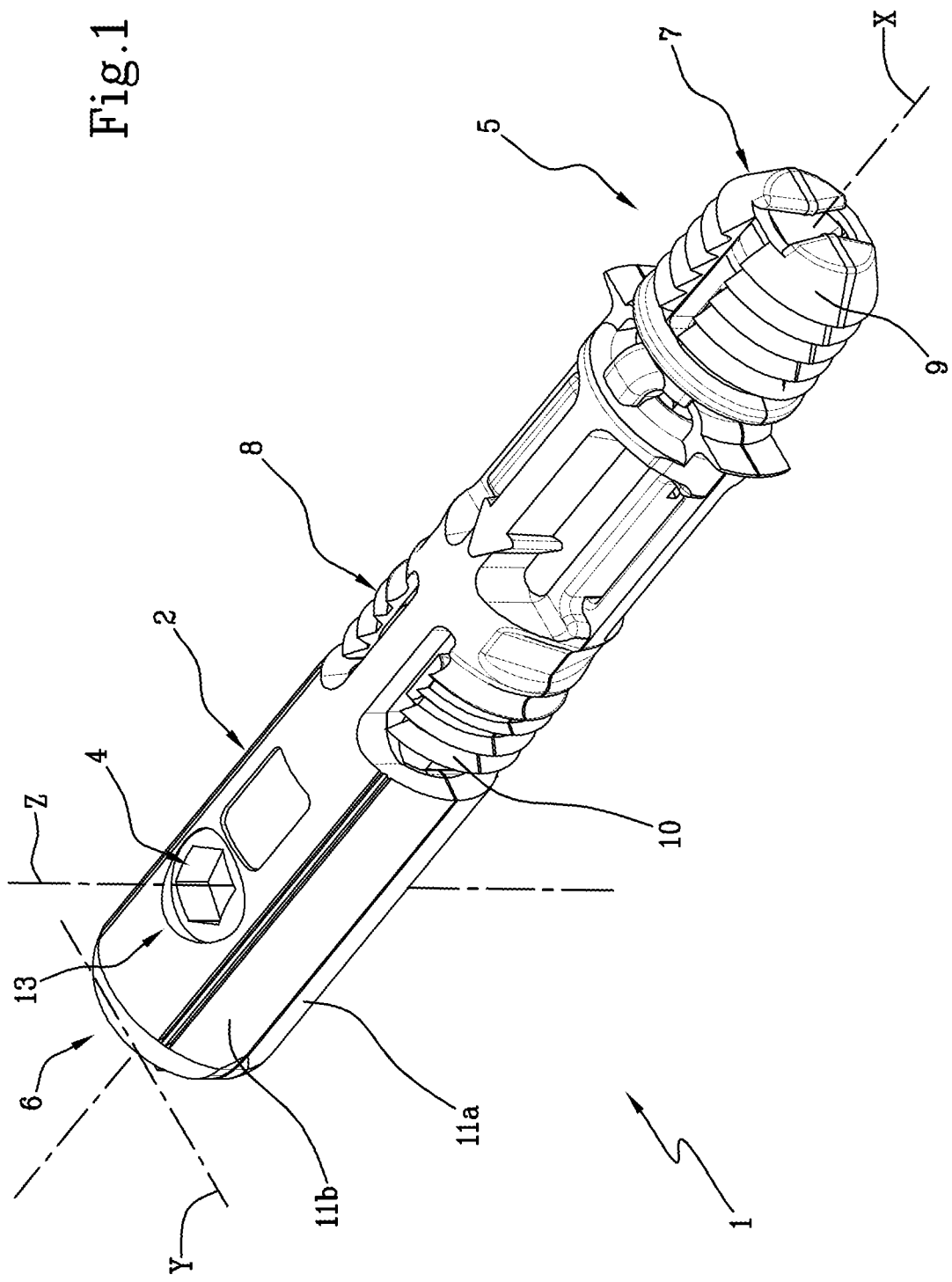

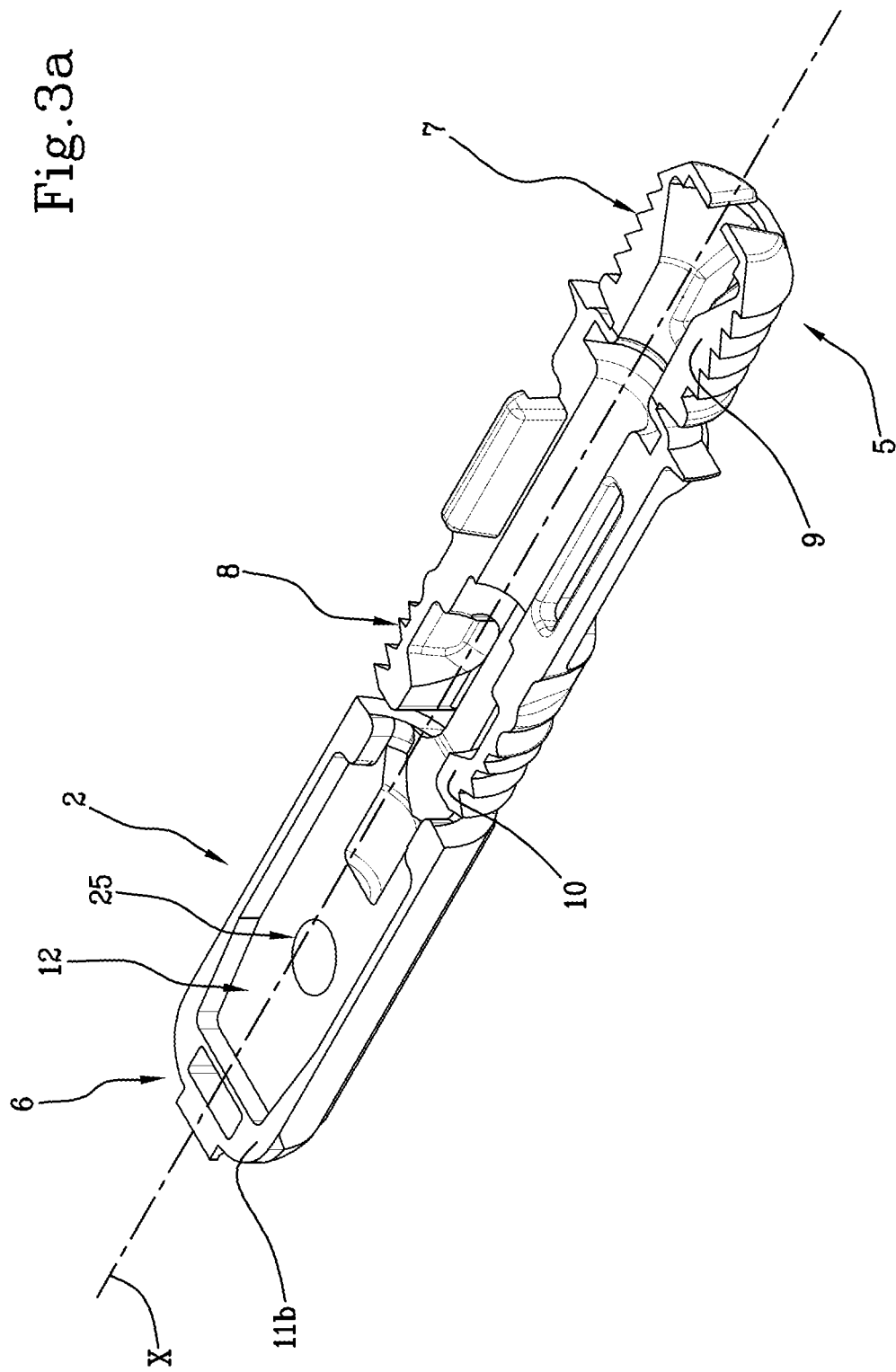

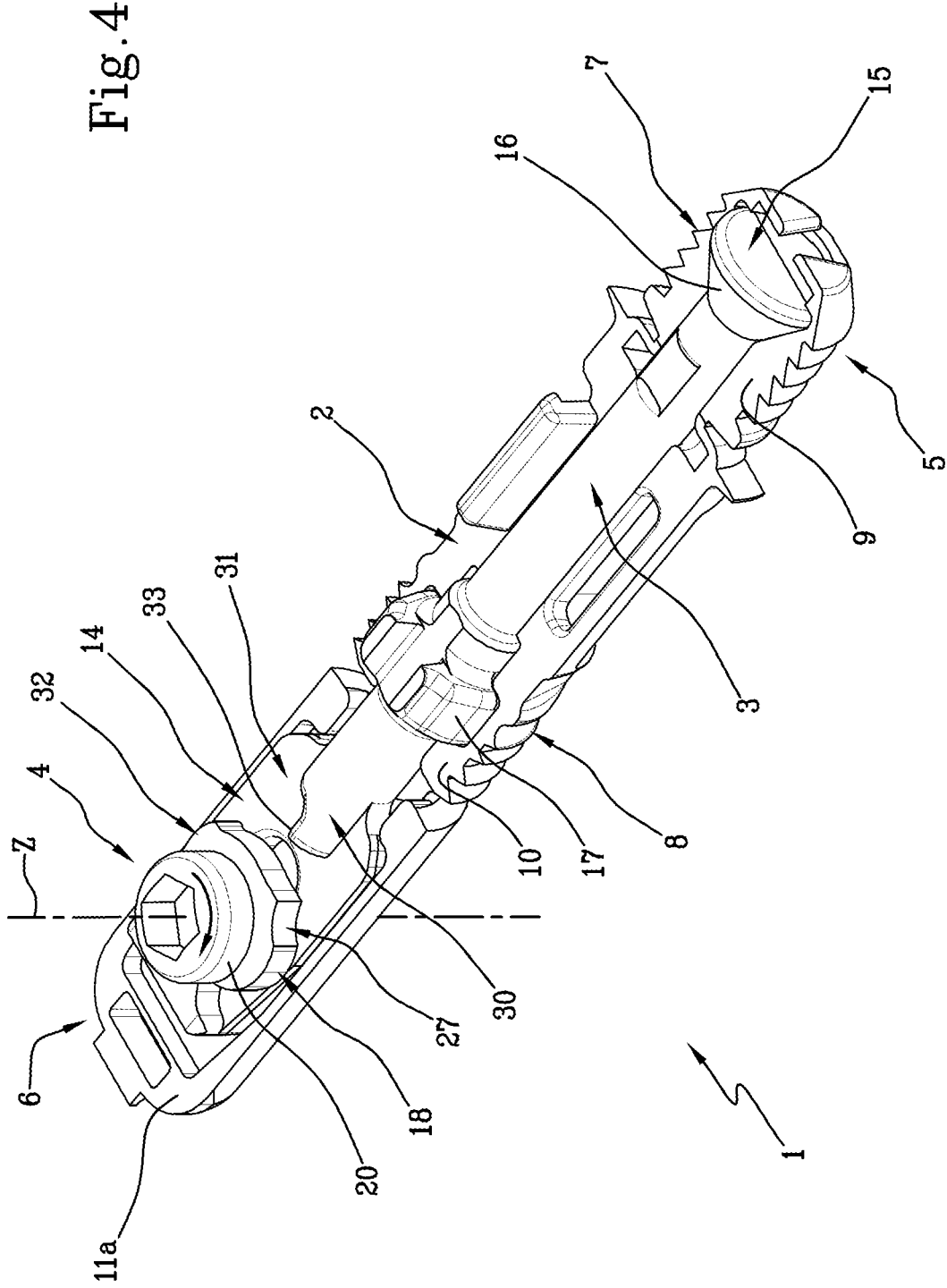

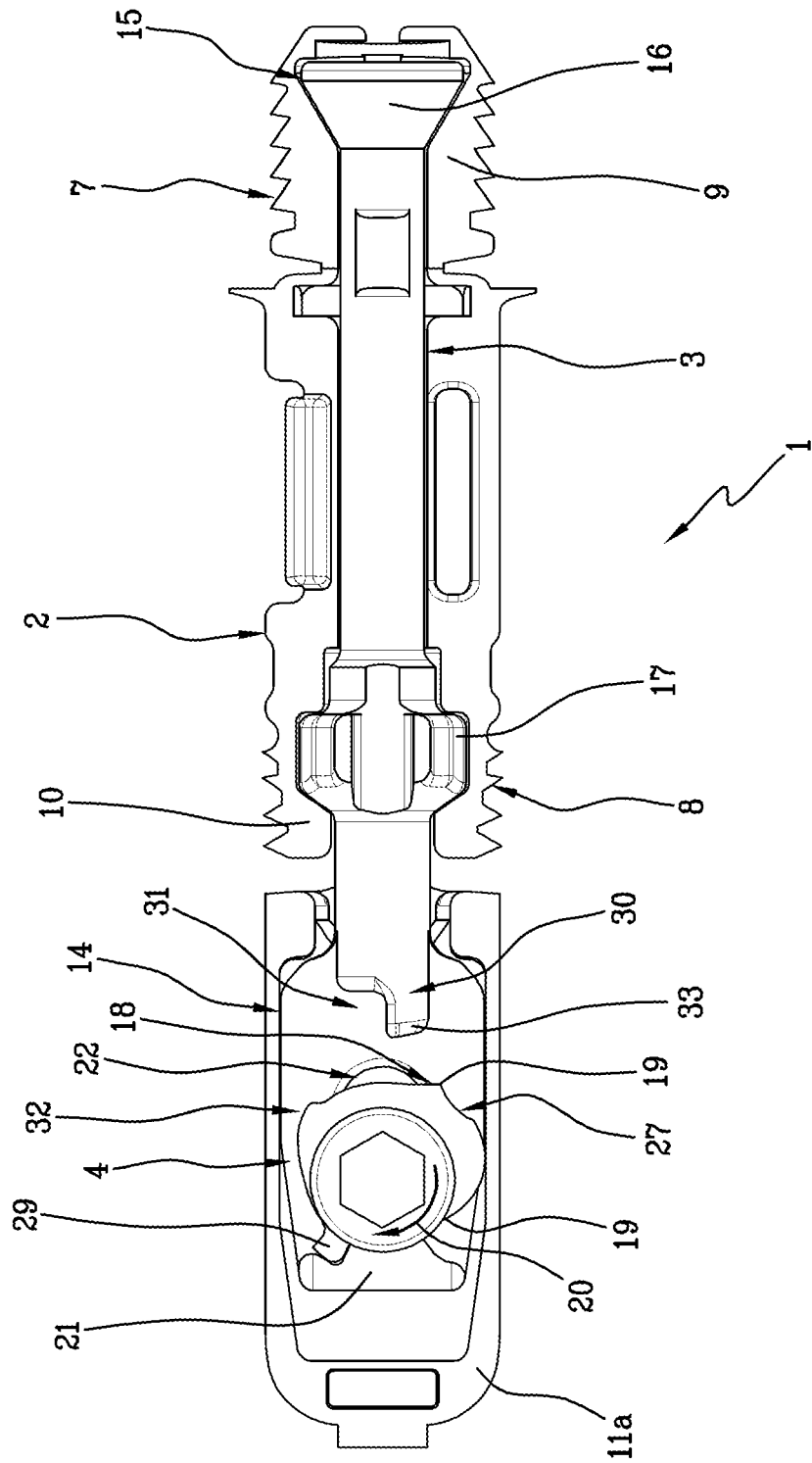

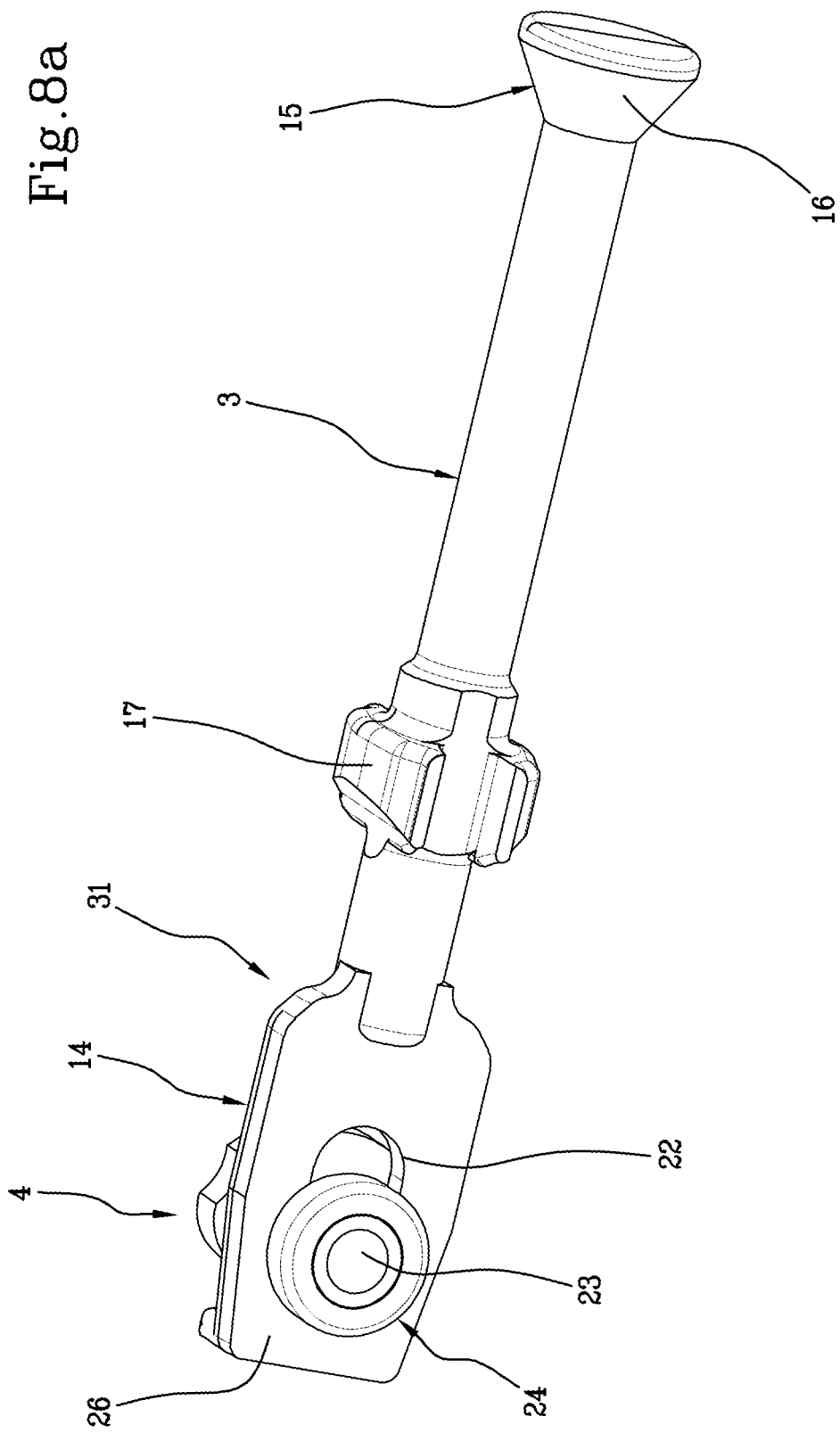

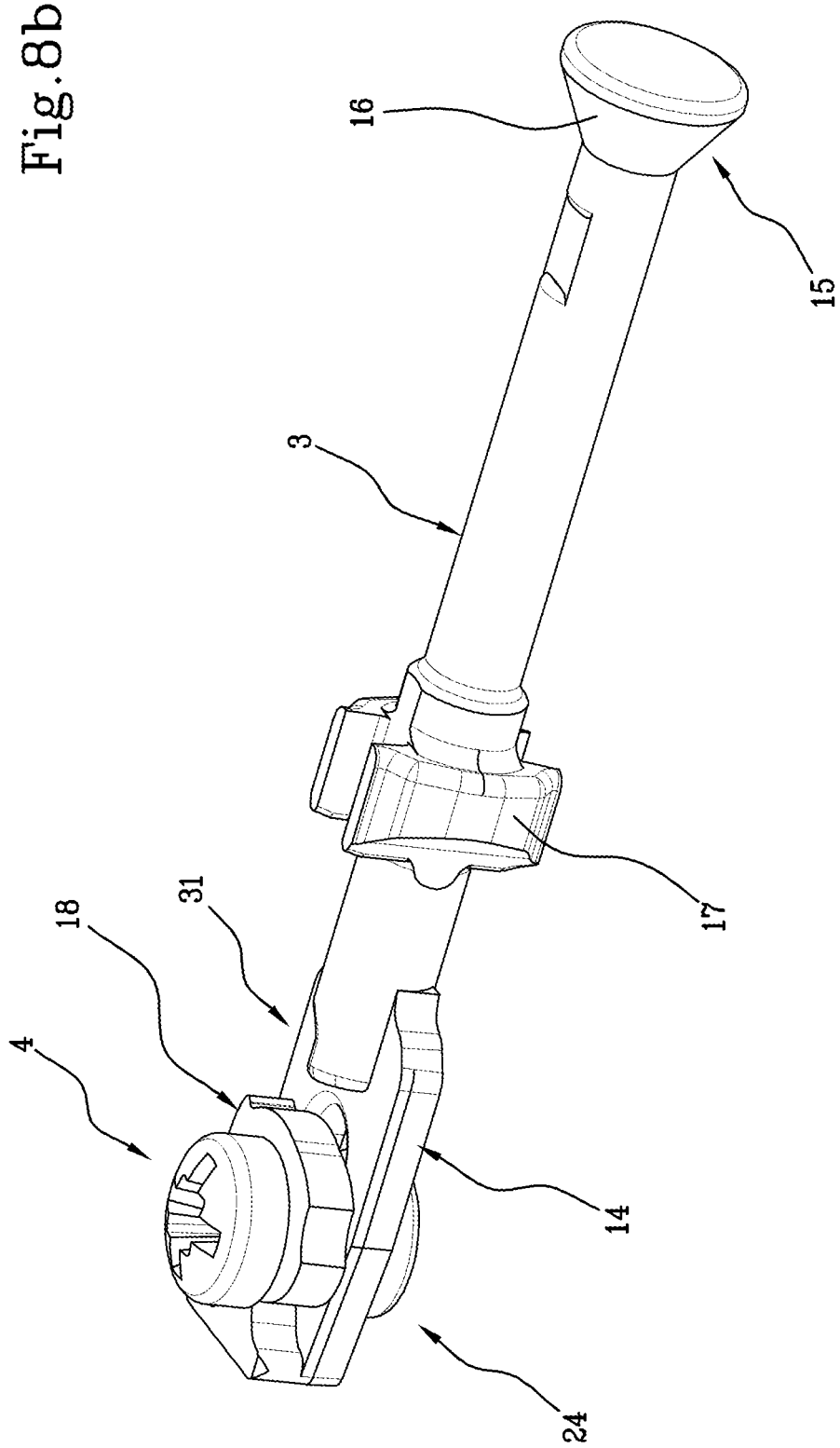

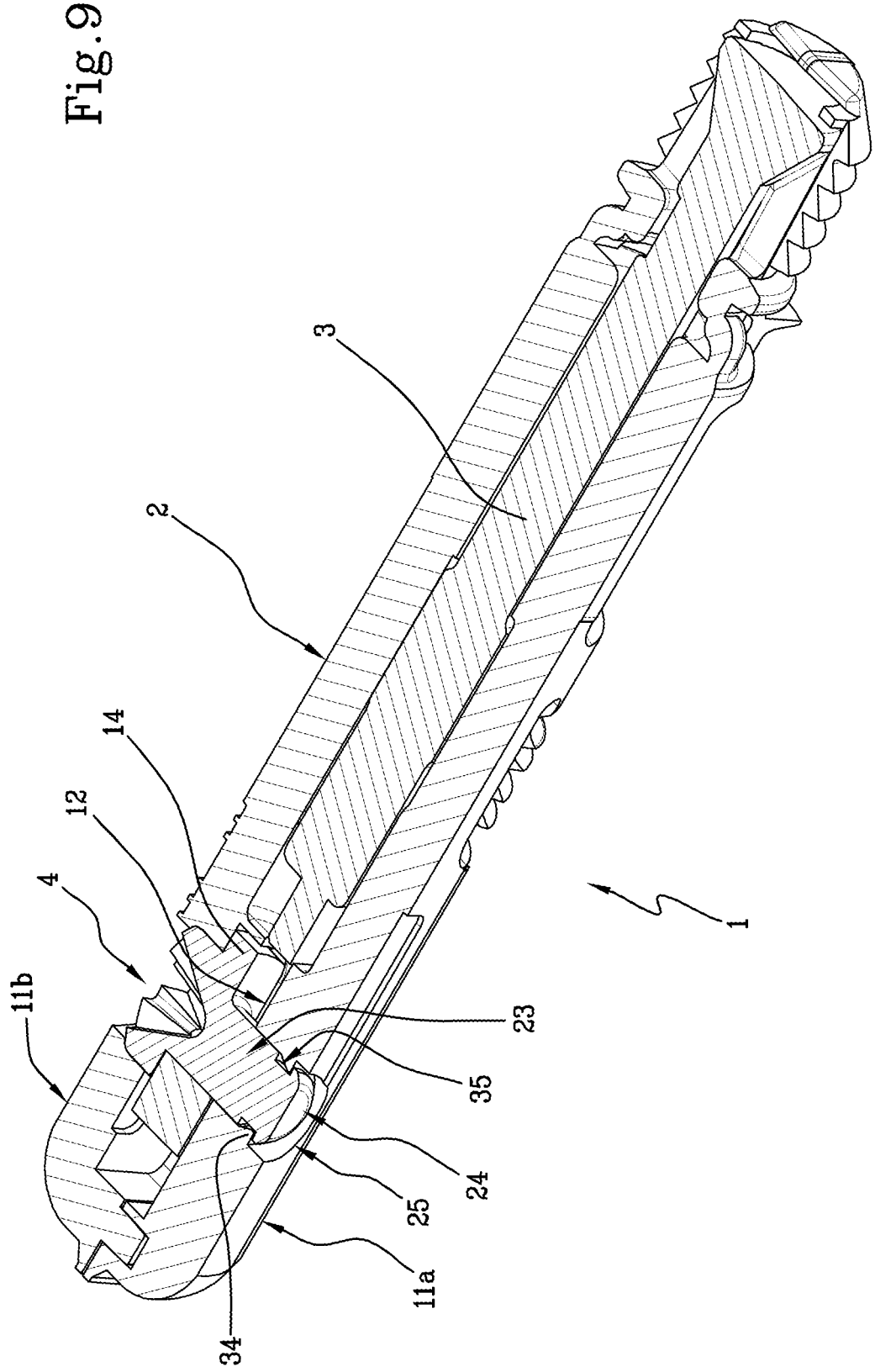

US 11,644,054 B2

JOINING DEVICE BETWEEN COMPONENTS OF AN ITEM OF FURNITURE

This application is the National Phase of International Application PCT/IB2017/058265 filed Dec. 21, 2017 which designated the U.S.

This application claims priority to Italian Patent Application No. 102017000028685 filed Mar. 15, 2017, which application is incorporated by reference herein.

TECHNICAL FIELD

The present invention relates to a joining device between components of an item of furniture. In detail, the present invention relates, preferably but not exclusively, to joining devices having a reduced outer diameter preferably of 8 mm.

PRIOR ART

In the furniture manufacturing sector, and more generally the furnishing elements manufacturing, the use of joining devices is known for connecting and tightening together different furniture components, in particular in the form of panels used as shelves or walls, in order to assemble the item of furniture and/or arrange it in the desired position in a room.

In particular, "plug" joining devices are known in which each one is inserted into respective holes already afforded in the components to be joined and that, during the tightening step, envisage the radial expansion of at least a portion of the device itself that grips inside the hole. Some examples of joining devices are described in documents DE29804267 and WO2016055218.

As disclosed for example in document WO2016199015 filed in the name of the same Applicant, joining devices are known comprising:
- a casing that extends along a longitudinal axis thereof between a first end that is received in a first seat of a first component of the item of furniture, and a second end inserted in a second component of the item of furniture. In particular, the casing comprises a first and a second radially expandable portion to engage the components of the item of furniture at the first and the second seat, respectively;
- a tie-rod housed in the casing and in an axially slidable way from a rest position, in which the radially expandable portions are retracted, to a locking position in which the radially expandable portions are expanded outside the dimensions of the casing. In particular, the tie-rod has a first and a second enlargement respectively at the radially expandable portions so as to perform the expansion of said portions by thrust;
- an eccentric element housed in the casing and operatively associated with an abutment portion of the tie-rod for axially moving the latter from the rest position to the locking position when the eccentric element is turned about its own axis of rotation.

In practice, by turning the eccentric from the outside (through a screwdriver or the like) a profile of the cam acts on the abutment portion so as to perform the axial displacement of the tie-rod which widens the expandable portions through contact with the enlarged parts of the tie-rod itself.

This type of joining device is preferably applicable for joining a horizontal panel (shelf) with a vertical wall.

In particular, in the document mentioned above, the eccentric element is a closed cylinder inside which there is a pin acting on the head of the tie-rod.

However, this known technique is not applicable in the event of creating a joining device having a reduced outer diameter (e.g. 8 mm) for particular applications. In this latter case, in fact, it is not possible to make the eccentric element in the form of a closed cylinder fit inside the joint. In any case, the mechanical parts closed into such closed cylinder would have such a reduced thickness that they would be fragile and easily subject to breakage.

OBJECT OF THE INVENTION

In this situation the object of the present invention is to realise a joining device between components of an item of furniture that obviates the above-cited drawbacks.

It is in particular an object of the present invention to realise a joining device between components of an item of furniture that can be produced with a reduced diameter and that is at the same time sufficiently strong, particularly in relation to the tie-rod movement system.

The indicated aims are substantially attained by a joining device between components of an item of furniture according to what is described in the appended claims.

BRIEF DESCRIPTION OF THE FIGURES

Further characteristics and advantages of the present invention will more greatly emerge from the detailed description that follows of some preferred but not exclusive embodiments of a joining device between components of an item of furniture illustrated in the appended drawings, in which:

FIG. 1 shows an axonometric view of the joining device between components of an item of furniture according to the present invention;

FIG. 2b shows an axonometric view from below of the first half-shell of FIG. 2a;

FIG. 3a shows an axonometric view from above of a second half-shell of the joining device of FIG. 1;

FIG. 3b shows an axonometric view from below of the second half-shell of FIG. 3a;

FIG. 4 shows an axonometric view from above of the inside of joining device of FIG. 1 in which the tie-rod and the cam element are also shown;

FIG. 5 shows a view from above of the inside of the joining device of FIG. 4 in a rest position;

FIG. 8a shows an axonometric view from below of an alternative embodiment of the connection between the tie-rod and the cam element of the device according to the present invention;

FIG. 8b shows a lateral axonometric view of the alternative embodiment of FIG. 8a in transparency for better highlighting some parts;

FIG. 9 shows a lateral axonometric view of an alternative embodiment of the connection between the tie-rod, the cam element and the casing of the device according to the present invention;

DETAILED DESCRIPTION OF SOME PREFERRED EMBODIMENTS OF THE INVENTION

Figure 2A:
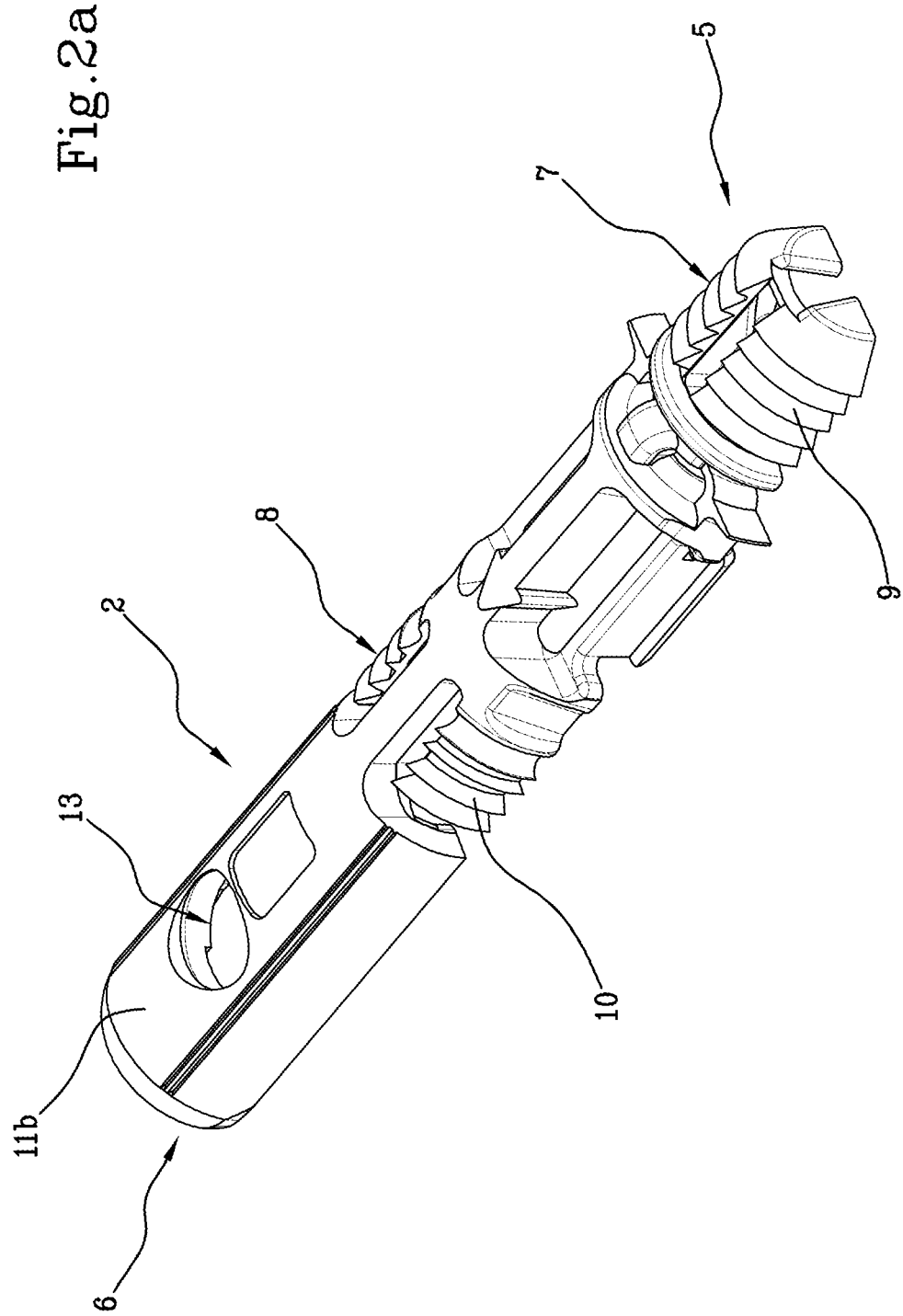
FIG. 2a shows an axonometric view from outside of a first half-shell of the joining device of FIG. 1.
Figure 2B:
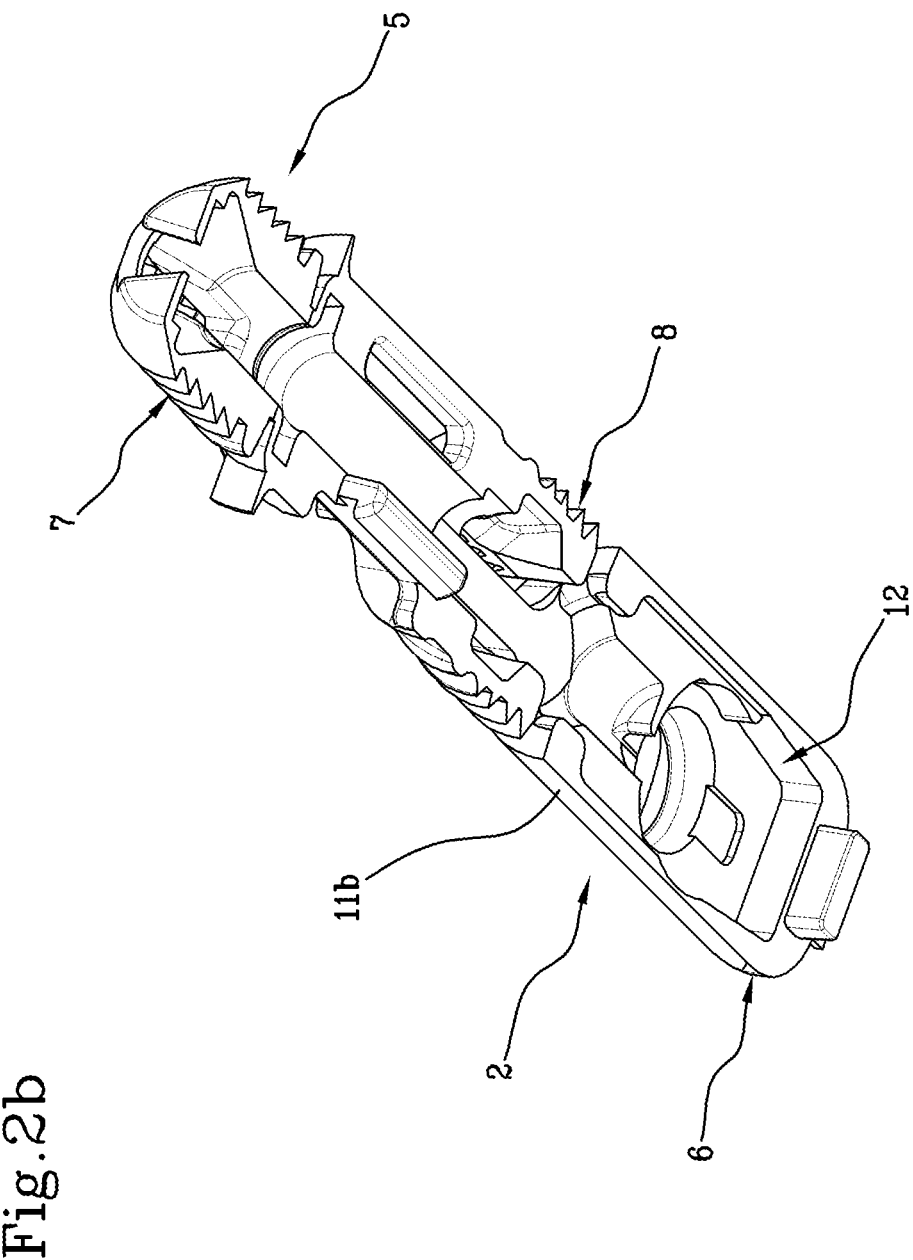

With reference to the figures mentioned, reference number 1 generally denotes a joining device 1 between components of an item of furniture according to the present invention.

As already set out above, the joining device 1 is provided to join and tighten a first and a second component of an item of furniture to each other, such as, for example, a first panel (e.g. front panel) and a second panel (e.g. lateral panel), oriented perpendicular to each other.

The panels are preferably made of ligneous material and have a thickness comprised between 12 mm and 30 mm, according to the most common construction standards in the furniture and furnishings sector in general.

It is to be understood that the first and second component of the item of furniture may be made of different materials or have different shapes and can be positioned for reciprocal coupling according to any other suitable arrangement.

The joining device 1 comprises a casing 2 inside which both a tie-rod 3 and a cam element 4 are arranged for moving the tie-rod 3.

The casing 2 extends along a longitudinal axis X thereof between a first end 5 that is susceptible to being received in a first seat afforded in the first component of the item of furniture, and a second end 6 susceptible to being received in a second seat afforded in a second component of the item of furniture.

To fix the device 1 to the seats, the casing 2 comprises a first 7 and a second 8 radially expandable portion, engageable respectively with the walls of the first and the second seat.

Preferably, the first portion 7 is defined at the first end 5 of the casing 2 and the second portion is defined at a middle portion of the casing 2.

The first portion 7 comprises a plurality of tabs 9 arranged next to each other, separated by respective axial slits, so as to form a collar defining the first end 5 of the casing 2.

Preferably, the tabs 9 are articulated to oscillate about a respective end thereof facing the opposite way with respect to the first end 5.

The second portion comprises a plurality of tabs 10, arranged on the diametrically opposite side of the middle portion of the casing 2, which are articulated to oscillate about a respective end thereof facing towards the first end 5.

In other words, the first 7 and the second portion 8 are deformable symmetrically between each other according to a perpendicular plane to the longitudinal axis X of the casing 2 so as to create a tightening as the two components of the item of furniture to be joined move towards each other.

Preferably, the outer surfaces of the tabs 9, 10 of the first 7 and of the second 10 portion have a saw-toothed profile for promoting the grip.

Preferably, at the first end 5 of the casing 2 there is a substantially cylindrical conformation with a circular section defined by the tabs 9 of the first portion 7. Likewise, at the second end 6 of a middle portion, the casing 2 has a substantially cylindrical confirmation with a circular section.

As can be seen from the appended figures, the casing 2 is formed by two half-shells 11a, 11b both concave and able to be coupled with each other so as to contain inside them (or define a housing compartment for) the tie-rod 3 and the cam element 4.

More precisely, the casing 2 comprises a first 11a and a second half-shell 11b.

Each half-shell 11a, 11b therefore has a lateral surface delimited by a peripheral edge and defining an elongated concavity extending along the longitudinal axis X.

Preferably, the two half-shells 11a, 11b are rotatably connected at a junction line Y orthogonal to the longitudinal axis X and preferably arranged at the second end 6. In other words, the two half-shells 11a, 11b are connected by a hinge arranged at the junction line Y and preferably made of the same material as the casing 2.

This advantageously allows the total number of pieces of the device 1 to be limited to three or four (according to the embodiment carried out) and therefore the assembly steps to be optimised.

Each half-shell 11a, 11b comprises a housing portion 12 for housing the cam element 4 and the head of the tie-rod 3, placed at the second end 6.

Preferably, such housing portion 12 has at least one through hole 13 afforded on the second half-shell 11b defining an access for allowing the movement of the cam element 4 by means of a manoeuvring tool (e.g. screwdriver).

Therefore, during use, the cam element 4 faces the outside of said through hole 13 with at least one portion thereof engaged by the manoeuvring tool, preferably a housing seat that may be a cross, a hexagon or any other shape not expressly cited herein.

The tie-rod 3 is arranged along the longitudinal axis X of the casing 2, between one head 14 and a free end 15, and is preferably made of metal material.

The tie-rod 3 is housed inside the casing 2 with the possibility of limited sliding along the longitudinal axis X Y between a rest position, in which the tie-rod 3 is moved closer towards the first end 5, and a locking position in which the tie-rod 3 is moved closer towards the second end 6.

The tie-rod 3 comprises a first stretch 16 with an enlarged section susceptible to engagement with the first portion 7 for determining the radial expansion of the casing 2 when the tie-rod 3 is moved into the locking position.

Furthermore, the tie-rod 3 comprises a second stretch 17 with an enlarged section susceptible to engagement with the second portion for determining the radial expansion of the casing 2 when the tie-rod 3 is moved into the locking position.

Preferably, the first stretch 16 is afforded at the free end 15, opposite the head 14, while the second stretch 17 is defined on a middle portion of the tie-rod 3.

Preferably, the first stretch 16 has a conical profile conformation, gradually tapered starting from the free end 15 towards the head 14, and susceptible to abutting the tabs 9.

In the preferred embodiment described herein, the second stretch 17 has a wedge-shaped conformation, i.e. preferably defined by a pair of inclined planes, tapered towards the head 14, susceptible to abutting the tabs 10.

Thanks to the formation of the tabs 9, 10 and of the enlarged section stretches 16, 17, when the tie-rod 3 is moved axially into the locking position, the tabs 9 and the tabs 10 are oscillated in opposite angular directions.

The cam element 4 is housed inside the casing 2, at its second end 6, with the ability to rotate about a main axis Z thereof, perpendicular to the longitudinal axis X. The cam element 4 is, in fact, located in the housing portion 12 of the casing 2.

Such cam element 4, preferably made of metal material, is therefore housed in the casing 2 and provided to operate in contact with the head 14 of the tie-rod 3 so as to move it axially towards the locking position following a rotation of the cam element 4 about the main axis.

Therefore, the cam element 4 is smaller than the casing 2 and integrated thereto, defining therewith and with the tie-rod 3 a single device 1 that can be moved and stored individually.

According to the present invention, the cam element 4 has a lobe 18 along its outer periphery with a forward profile 19 having a predefined extension about the axis of rotation Z such as to perform, alone, the displacement of the tie-rod 3 with respect to the casing 2 from the rest position to the locking position so as to actuate the expansion of both portions 7,8 with a single movement according to a forward rotation direction 20 of the cam element 4.

In other words, the cam element 4 has a forward (upward) profile 19 that increases the lateral dimension of the element itself (so as to define the "cam") so as to distance the abutment portion 21 with respect to the axis of rotation Z, thus generating the axial movement of the tie-rod 3.

In particular, as already mentioned, the tie-rod comprises a head 14 arranged at the second end 6 of the casing 2 and the abutment portion 21 of the tie-rod is afforded at said head 14.

In particular, the abutment portion 21 is arranged at said head 14 and rises in relief on the head 14 so as to enter into interference with the cam element 4 for realising said displacement of the tie-rod 3.

Precisely, the abutment portion 21 is arranged above the cam element 4 moving from the enlarged section stretches 16, 17 towards the head 14.

In other words, the cam element 4 is arranged overlapping with said head 14 and is interposed between the abutment portion 21 and the rest of the tie-rod 3 considering the longitudinal axis X of the casing 2.

Preferably, the abutment portion 21 has a shaped relief configured to come into contact with said cam element 4. In particular, such relief is preferably centred with respect to the axis W of the tie-rod (in use coinciding with the axis X of the casing 2) so as to promote the axial sliding movement.

In particular, the head 14 of the tie-rod 3 has a slot 22 extending along the axis of the tie-rod 3 with which the cam element 4 is slidably associated for realising said displacement of the tie-rod 3.

The abutment portion 21 is arranged externally with respect to said slot 22. In other words, the shape of the slot 22 does not define said abutment portion 21.

In detail, the slot 22 has a rectilinear extension along the axis of the tie-rod 3 (it does not have any internal shaping).

In the embodiments visible in the appended figures, the head 14 of the tie-rod 3 has a slot 22 extending along the axis of the tie-rod 3 and the cam element 4 comprises a pin 23 passing through said slot 22.

In particular, the through pin 23 has a fixing end 24 opposite the rest of the cam element 4 inserted inside a hole 25 afforded in the casing 2.

Figure 3B:
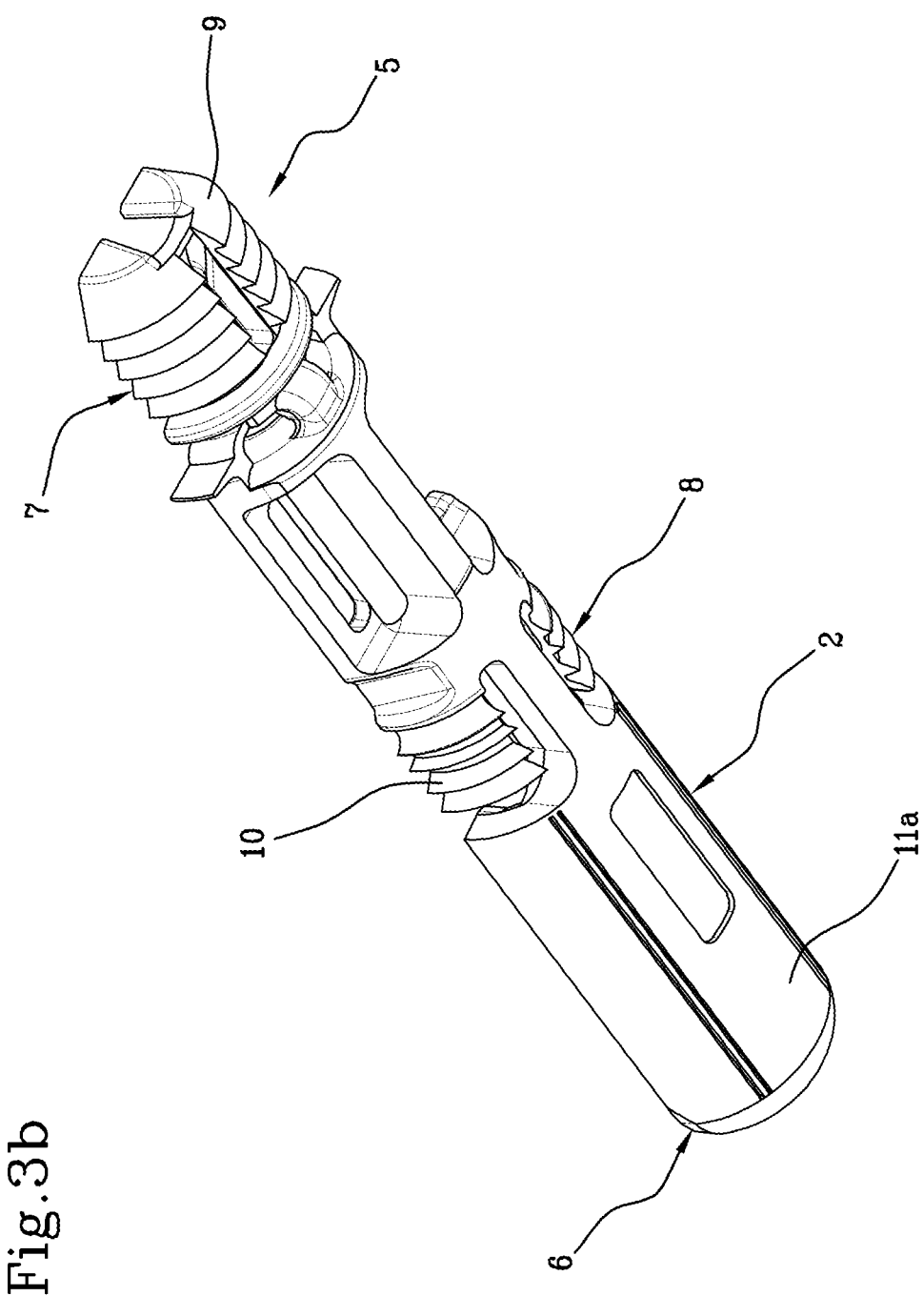

With regard to the pin 23 and the hole 25, there are four embodiments. The first embodiment (visible for example in FIG. 3a) envisages said hole 25 being blind and the part of casing 2 arranged around said hole 25 being solid and preferably reinforced so as to keep the pin 23 as stable as possible inside the hole.

In the second embodiment illustrated in FIGS. 8a and 8b, the device 1 comprises a locking disc 26 (or washer) inserted at the fixing end 24 of the pin 23 so that the flat surface of the disc 26 comes into contact with the head 14. Furthermore, the fixing end 24 has an enlarged head (preferably it is clinched) so as to stop the locking disc 26 between it and the head 14 of the tie-rod 3. Advantageously this embodiment prevents the head 14 of the tie-rod 3 being inclined especially at the stroke end so as to always keep it guided between the cam element 4 (on one side) and the locking disc 26 (on the other side). In this latter embodiment, the hole 25 preferably passes through the related half-shell.

In a third embodiment, illustrated in FIG. 9, the pin 23 has at the fixing end 25 a groove 35, preferably circumferential, configured to define a joint with a tooth 34 afforded inside the hole 25 and projecting towards the inside of the hole 25 itself. In other words, the tooth 34 is inserted inside the groove 35 so as to lock the pin 23 (and therefore also the cam element 4) in position. Preferably, the tooth 34 is part of the casing 2 and made with the casing 2 itself.

It is to be noted that the distance between the housing portion 12 and the tooth 34 is substantially equal to the distance between the rear surface of the head 14 and the groove 35 arranged on the pin 23 so as to keep the cam element 4 abutted against the head 14 so that such cam element 4 works on the plane avoiding any inclinations of the tie-rod 3 movement system.

Preferably, the hole 25 is a through hole from the housing portion 12 through the half-shell towards the outside.

Advantageously, this third embodiment allows a mechanical "fitting" of the pin 23 (and therefore also the cam element 4) to be obtained with respect to the casing 2 so as to ensure a correct movement.

In a fourth embodiment illustrated in FIGS. 10-15, the device 1 comprises two of said cam elements 4 (as described above and respectively indicated below as upper cam element 4a and lower cam element 4b) respectively arranged on opposite sides with respect to the head 14 of the tie-rod 3 with reference to the axis of rotation Z. In detail, the expression "opposite sides" means above and below the head 14 of the tie-rod 3 with reference to the axis of rotation Z.

In particular, said cam elements 4a, 4b are respectively connected to the opposite ends of said through pin 23. Furthermore, the tie-rod 3 comprises two abutment portions 21a and 21b arranged on opposite sides with respect to the head 14 of the tie-rod 3 and engaged with a respective cam element 4a, 4b.

The upper cam element 4a is arranged at a front side that can be activated by a tool for turning the cam element 4 itself (where there is a shaping for inserting the screwdriver or Allen key or the like). Preferably, such upper cam element 4a is made of more resistant material with respect to the lower cam element 4b (arranged at the rear) which is preferably made of the same material as the abutment portion 21b against which it is engaged.

Preferably, the upper cam element 4a is made of more resistant material and preferably is made of steel, while the lower cam element 4b is made of Zamak like the lower abutment portion 21b. Advantageously, this makes it possible to prevent the tool wearing away the upper cam element 4a, and at the same time the lower cam element 4b operating with an upper abutment portion 21a made of the same material so that the degree of deterioration is substantially the same.

Moreover, the lower cam element 4b has larger radial dimensions along its outer periphery around the axis of rotation Z with respect to the upper cam element 4a, so that the lower cam element 4b works more against the respective lower abutment portion 21b with respect to the upper cam element 4a against the upper abutment portion 21a.

In particular, from FIG. 11c it can be seen that the larger dimension of the lower cam element 4b is defined by a larger radial dimension of the lobe 18 and, in detail, of the forward profile 19. Such larger dimension can be seen in FIG. 11c in the form of a circular crown portion 41 of the lower cam element 4b that projects more than the upper cam element 4a.

Figure 6:
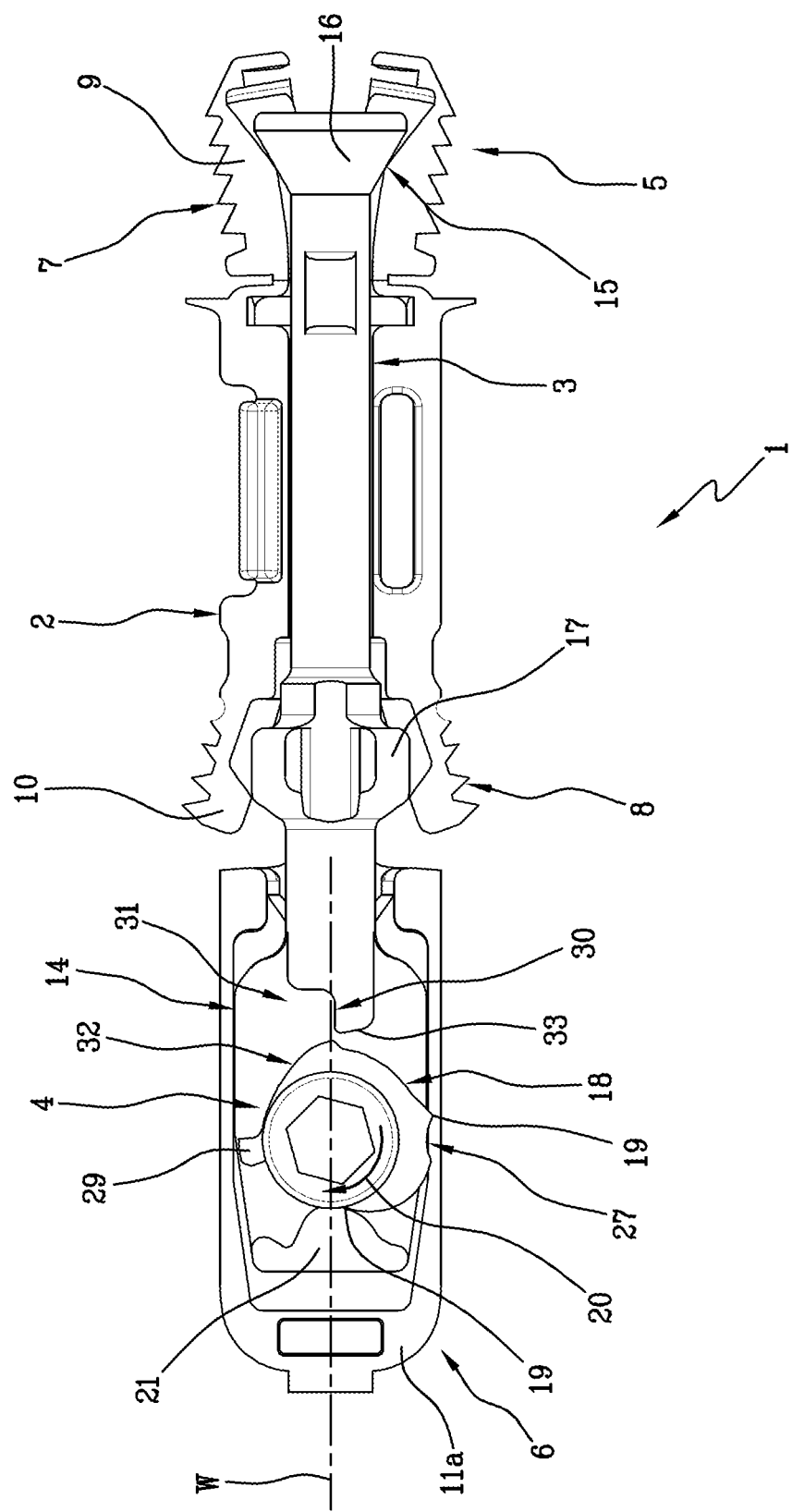
FIG. 6 shows a view from above of the inside of the joining device of FIG. 4 in an intermediate position.
Figure 7:
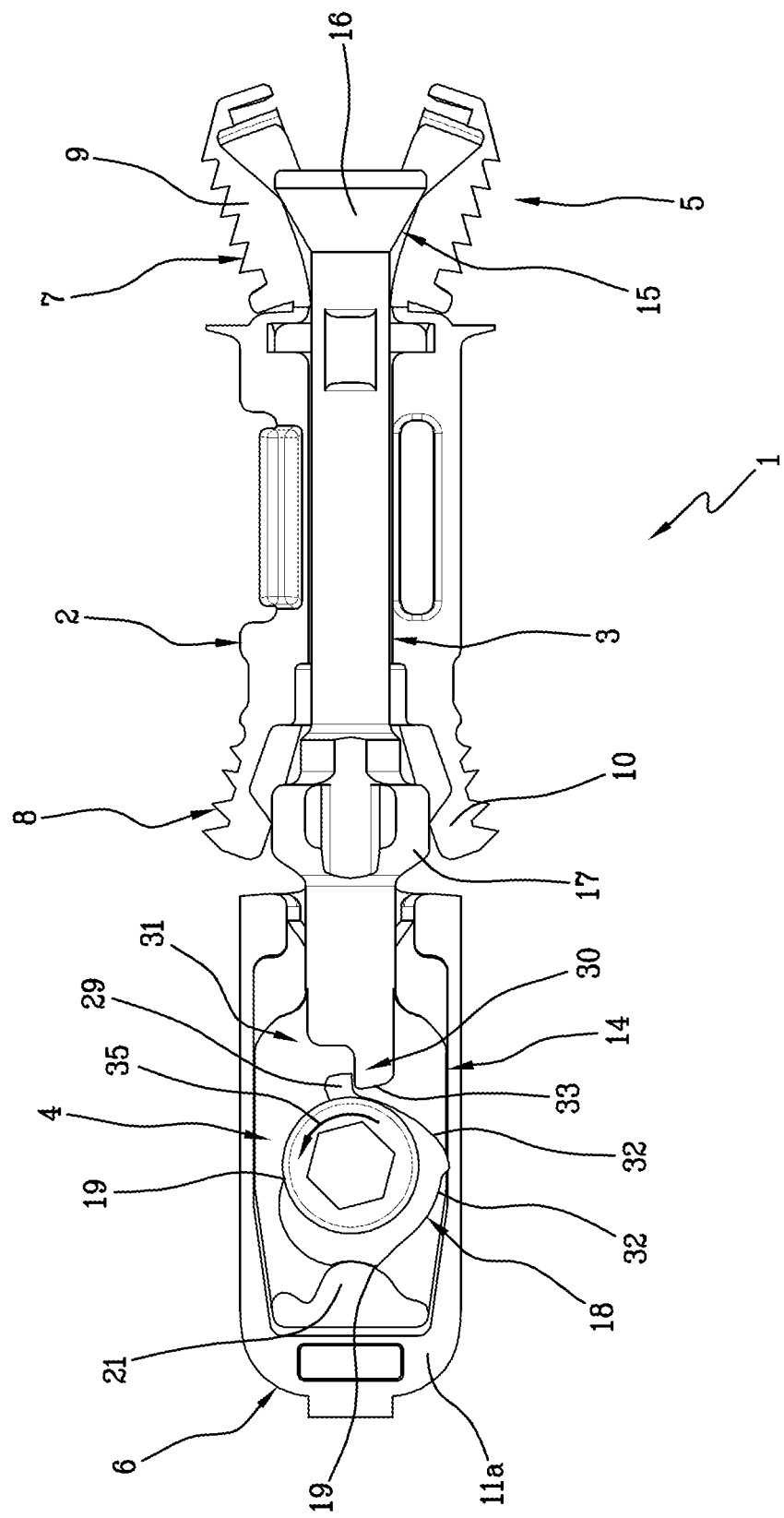
FIG. 7 shows a view from above of the inside of the joining device of FIG. 4 in a locking position.
Figure 10:
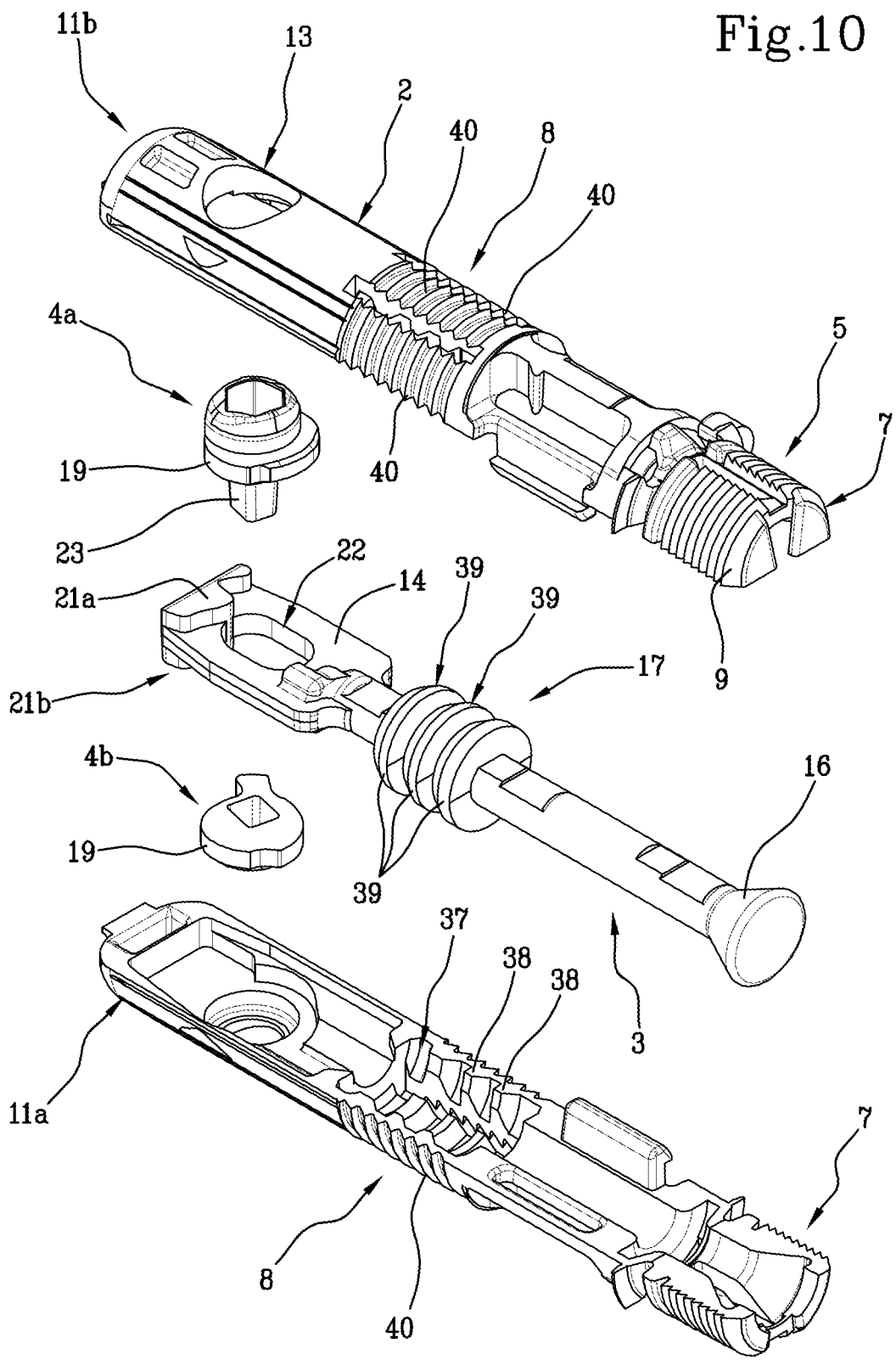
FIG. 10 shows an exploded view of an alternative embodiment of a joining device according to the present invention.
Figure 11:
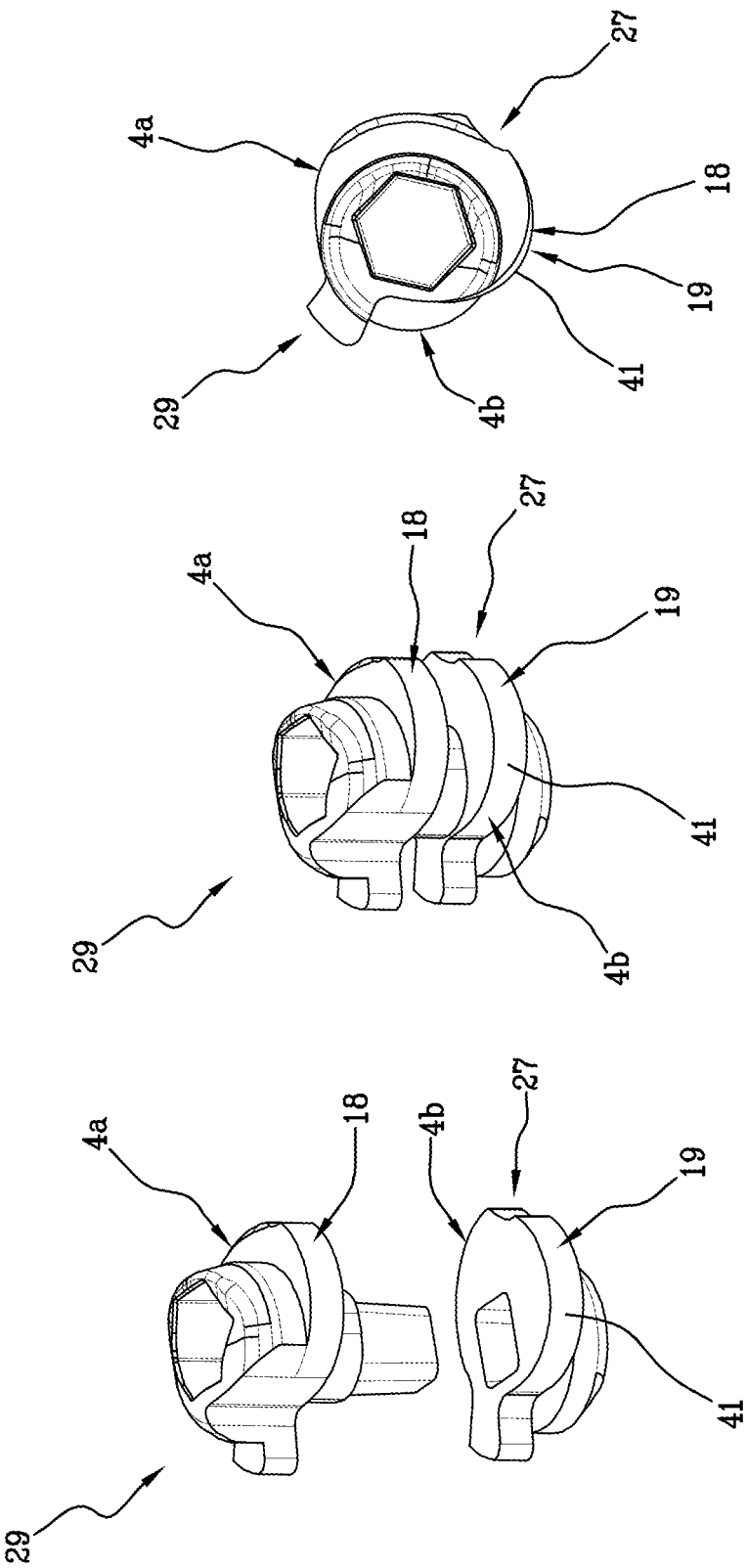
FIGS. 11a, 11b, 11c show, in various axonometric views, the composition of two cam elements having different dimensions with reference to the device of FIG. 10.
Figure 12:
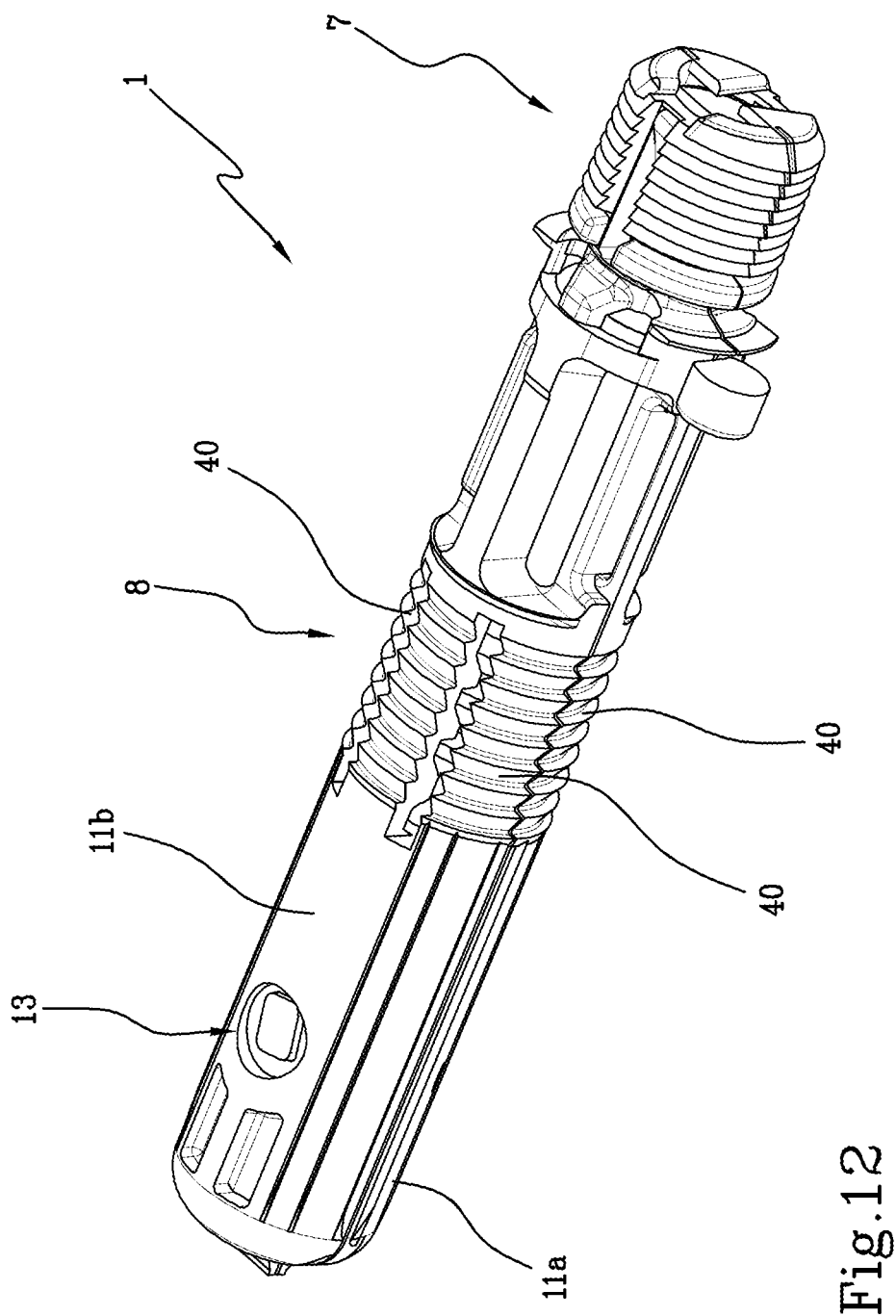
FIG. 12 shows an axonometric view of the joining device of FIG. 10 with the casing closed.
Figure 13:
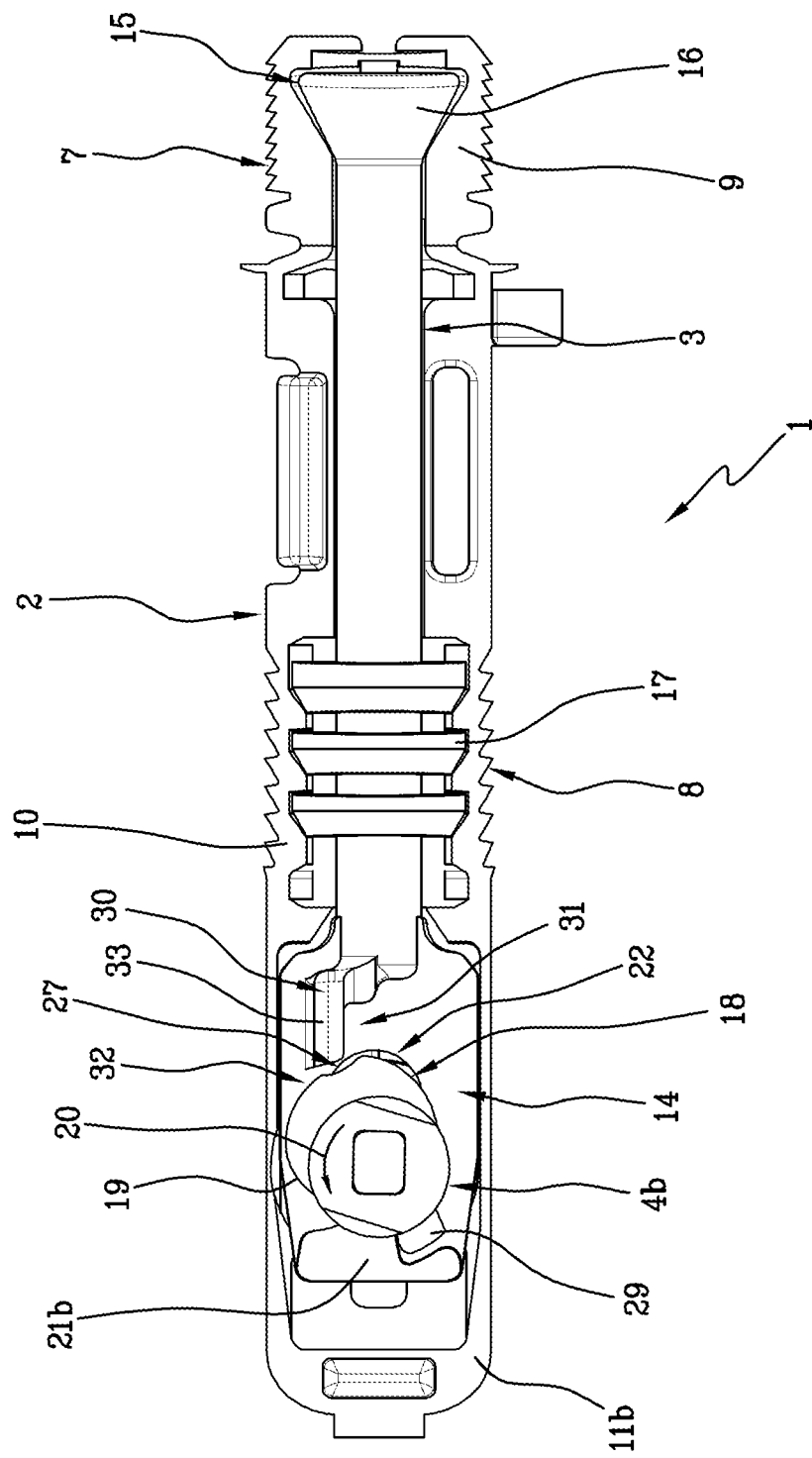
FIG. 13 shows a view from below of the inside of the joining device of FIG. 10 in a rest position.
Figure 14:
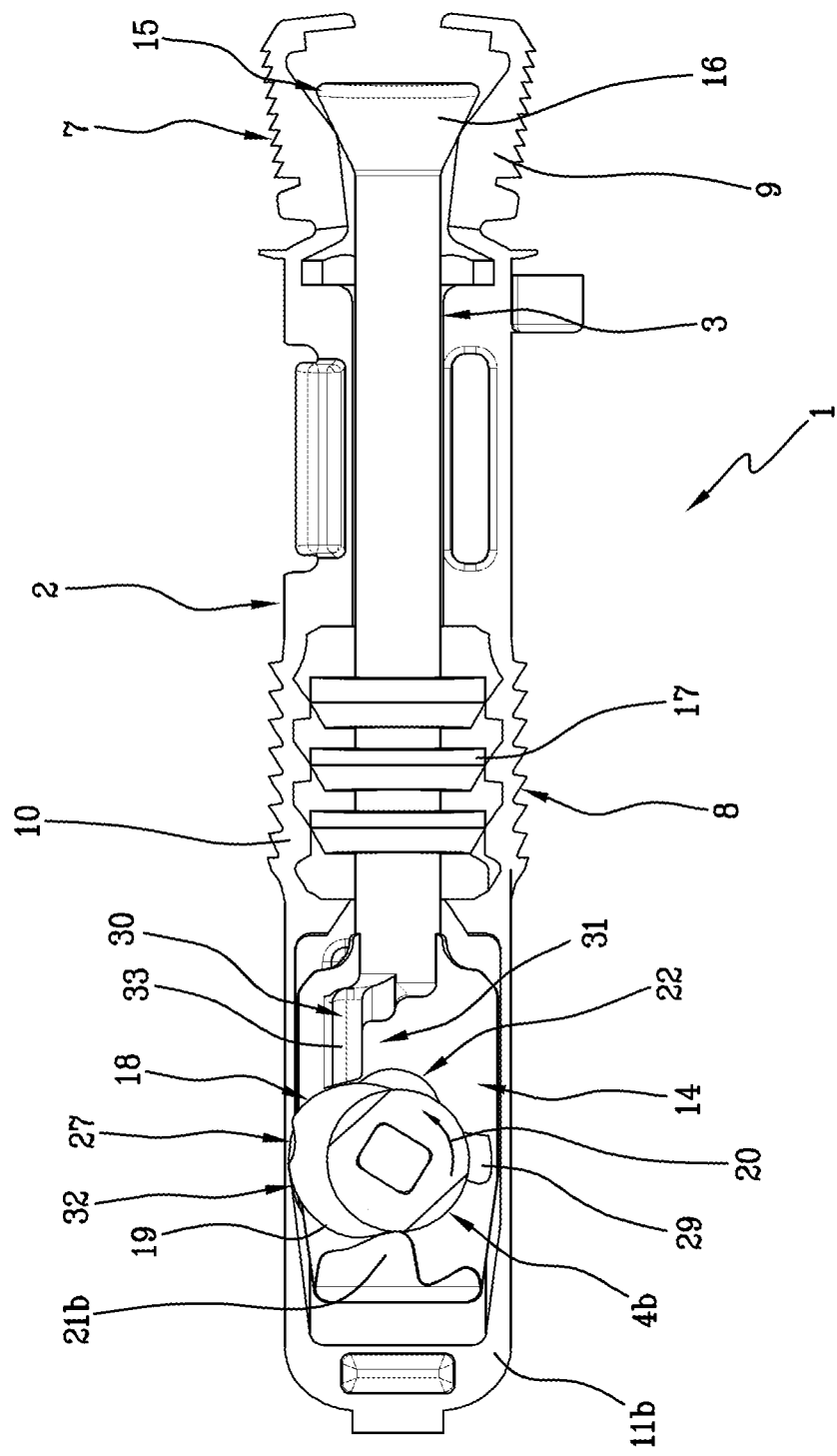
FIG. 14 shows a view from below of the inside of the joining device of FIG. 10 in an intermediate position.
Figure 15:
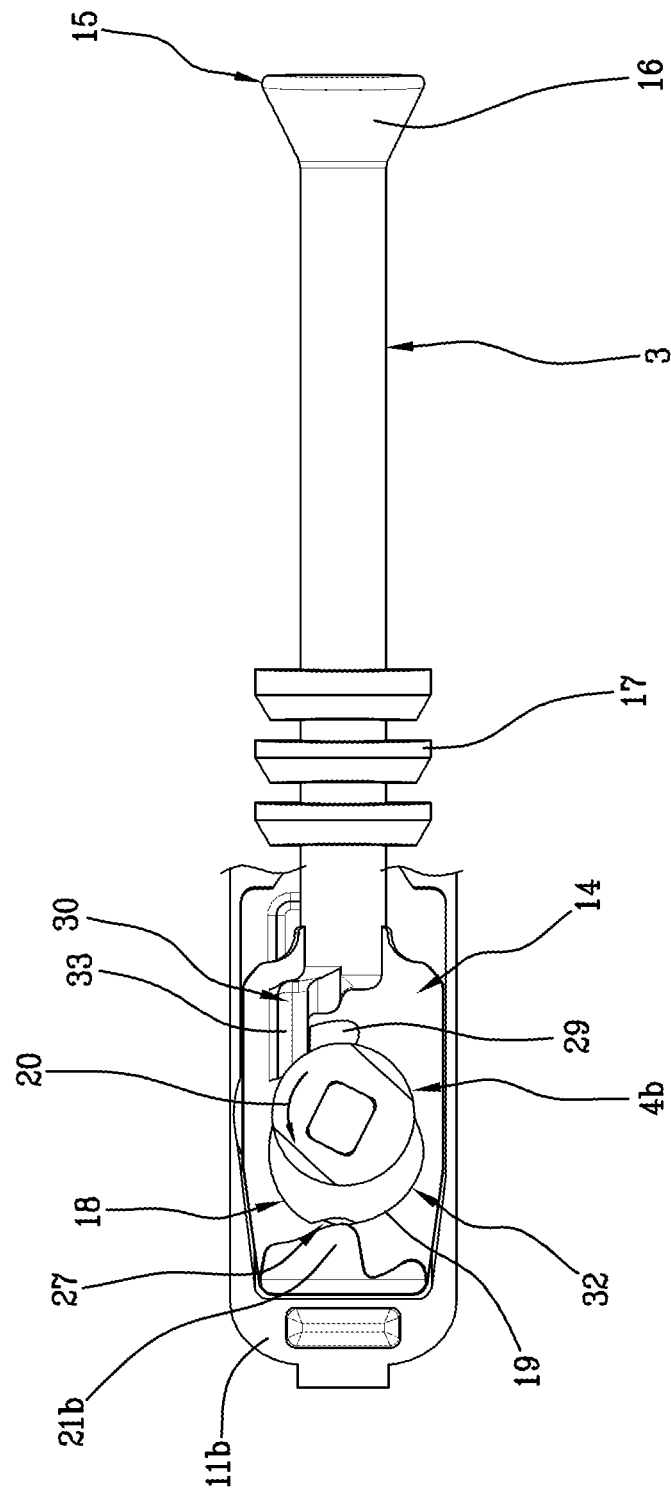
FIG. 15 shows a view from below and with partial casing of the inside of the joining device of FIG. 10 in a locking position.

FIGS. 13-15 represent the different work positions of the tie-rod 3 with particular reference to the lower cam element 4b that reflect the work positions represented in FIGS. 5-7 of the upper cam element 4a. Of course, the two cam elements 4a and 4b are solidly connected and rotate together.

According to another aspect of the present invention, the forward profile 19 ends with a top and has a consecutive hollow 27 adapted to receive the abutment portion 21 so as to define the locking position. Such hollow 27 has a "basin" shape, preferably counter-shaped to the more projecting curvature of the abutment portion 21 adapted to house the abutment portion 21. In this way, a user operating the rotation of the cam element 4 has the sensation of feeling when the stroke end is reached, which corresponds to the locking position (FIG. 7).

Furthermore, the device 1 comprises a mechanical stop means for stopping the cam element 4 with respect to the tie-rod 3 in the locking position in which said mechanical stop means is separate from said forward profile 19 and from said hollow 27.

In particular, such mechanical stop means comprises a stop tooth 29 afforded on the outer periphery of said cam element 4 and a stop element 30 afforded on the tie-rod 3 at the position of the stop tooth 29 during the locking position.

Preferably, the mechanical stop means is arranged in a diametrically opposite position with respect to the hollow 27 so that when the abutment portion 21 is in the hollow 27, the stop tooth 29 comes into contact with the stop element 30 for defining the mechanical stop.

Advantageously, such system allows the aforementioned stroke-end sensation to be obtained and, at the same time, an actual mechanical lock to be defined so as to prevent any further forcing of the cam element 4.

Preferably, the stop element 30 is defined by a seat afforded on a joining portion 31 of the tie-rod 3 with respect to the head 14. In fact, while the tie-rod 3 has a substantially circular section, the head 14 is flat. Therefore, the joining portion 31 is the part in which the head 14 is joined to the rest of the tie-rod 3 and there is an increase in thickness of the tie-rod 3. At such joining portion 31 it is advantageous to afford the seat as a "lack of material" with respect to a known joining portion 31. In other words, the seat is a bas-relief afforded on the joining portion 31 of the head 14 with the rest of the tie-rod 3.

Alternatively, such seat could be independent with respect to the joining portion 31 and be afforded inside the casing 2 or in another zone of the head 14.

According to another aspect of the present invention, the cam element 4 has a return profile 32 afforded along the outer periphery of said cam element 4 and angularly offset with respect to the forward profile 19. Such return profile 32 is operatively associated with a further abutment portion 33 afforded on the tie-rod 3 for displacing the latter by contact from the locking position towards the rest position when said cam element 4 is turned according to an opposite return rotation direction 35 with respect to the forward rotation direction 20.

Advantageously, these characteristics allow the initial condition to be restored, bringing the tie-rod 3 back towards the rest position. In this way, the tabs 9, 10 of the expandable portions 7, 8 tend to return (by elasticity) towards the initial position.

In FIG. 7 it is possible to see that such further abutment portion 33 is defined by the joining portion 31 of the tie-rod 3 with respect to the head 14 and, in particular, by the part of joining portion 31 that extends more towards the cam element 4. Such joining part 31 preferably has a surface inclined in the opposite direction with respect to the return profile 32 (FIG. 7) so as to promote the sliding of these two elements between each other.

It is to be noted that the return profile 32 extends from one top (preferably different from the top of the forward profile 19) which abuts with the further abutment portion 33 of the tie-rod 3 for pushing it towards the rest position.

Preferably, the stop tooth 29 is arranged at the end of the slope defined by the return profile 32.

According to the present invention, the cam element 4 is defined by a single lobe 18 having said forward and return profiles. Such lobe 18 extends preferably for about ¾ of the circumference of the cam element 4.

As already mentioned numerous times, the casing 2 of the device 1 according to the present invention has a maximum outer diameter less than 10 millimetres and preferably of 8 millimetres.

According to another aspect of the present invention (FIGS. 10-15), it is to be noted that said second enlargement 17 of the tie-rod 3 arranged at the second radially expandable portion 8, comprises a plurality of radial shoulders 36 distanced from each other along the longitudinal axis X so as to define an alternation of apexes and grooves, wherein in said radially expanded condition each radial shoulder 36 is engaged, in radial thrust, with the second radially expandable portion 8 so as to realise a prolonged expansion of said second portion 8 that extends at least to said radial shoulders 36.

Advantageously, in this way each radial shoulder 36 defines a radial thrust point on the respective expandable portion 8, allowing greater distribution of the effort and, therefore, higher resistance to extraction.

Advantageously, in this way the "wing" effect is prevented, distributing the "gripped" portions of the expandable sector 8 more evenly.

In particular, the second radially expandable portion 8 comprises a radially external surface and a radially internal surface 37, slidably associated with the second enlargement and having a succession of radial projections 38 distanced from each other along the longitudinal axis X and positioned so that:

in the rest position and with reference to the longitudinal axis X, the radial shoulders 36 alternate with the radial projections 38;

in the locking position and with reference to the longitudinal axis X, each radial shoulder is arranged at a respective radial projection 38 of the second portion 8 and abutted thereto in radial thrust to expand said second portion 8.

Advantageously, in this way each radial shoulder 36 finds a corresponding radial projection 38 that maximises the radial thrust action of the casing 2 on the walls of the seat of the respective component.

Furthermore, the radial shoulders 36 have a wedge-shaped conformation provided with a sliding surface 39 inclined with respect to the longitudinal axis X so that a translation of the tie-rod 3 along said longitudinal axis X corresponds to a radial thrust action of the radial shoulder 36 on the second radially expandable portion 8.

In the preferred embodiment, the radial shoulders 36 are each defined by a respective disc-shaped shoulder extending around the longitudinal axis.

Furthermore, the second radially expandable portion 8 comprises a plurality of segments 40 expandable among each other, angularly spaced around said longitudinal axis X and each developing, along the longitudinal axis X, between two end portions each constrained to the casing 2 so that a central portion of said segments, arranged between said end portions, expands. Each expandable segment 40 has a radially internal surface provided with said succession of radial projections 38.

A method is also described below for realising a joining device 1 between components of an item of furniture. Such method follows directly from the above description for the device 1 which is recalled below in its entirety.

In particular, the method comprises the steps of:
providing the casing 2;
providing the tie-rod 3;
inserting the tie-rod 3 in the casing 2;
providing the cam element 4 and housing it in said casing 2.

According to the present invention, the method envisages realising the cam element 4 so that along its outer periphery it has a forward profile 19 having a predefined extension about the axis of rotation Z such as to perform, alone, the displacement of the tie-rod 3 with respect to the casing 2 from the rest position to the locking position so as to actuate the expansion of both portions with a single movement according to a forward rotation direction 20 of the cam element 4.

Furthermore, the method envisages closing the two half-shells 11a, 11b of the casing 2 so as to contain the tie-rod 3 and the cam element 4 inside it, preferably through rotation about the axis of rotation Y thanks to the aforementioned hinge.

As regards the operation of the present invention, it envisages that, following the insertion of the device 1 in the holes provided in the movable components to be joined, the cam element 4 is turned from the outside.

The rotation of the cam element 4 is shown in FIGS. 5 to 6 in which it can be seen that the lobe 18 starts with a forward profile 19 which, coming into contact with the abutment portion 21, moves the tie-rod upwards causing interference of the enlargements of the tie-rod 3 with the two expandable portions that expand outwards. The expansion of the two expandable portions defines the locking of the two components of the items of furniture and a simultaneous movement of the two components towards each other since the expandable portion 7 is arranged inside the first component of the item of furniture while the second expandable portion is arranged inside the second component of the item of furniture.

The locking position (FIG. 7) is identified by the user thanks to the presence of the hollow 27 that allows the end of the stroke to be noticed (end of the forward profile 19). Furthermore, the locking position is defined by the presence of the stop means that defines a mechanical lock so as to prevent further rotations of the cam element 4.

By turning the cam element 4 according to an opposite rotation direction, the return profile 32 comes into contact with the further abutment portion 33 of the tie-rod 3 and generates a downward thrust of the tie-rod 3 so as to bring it back towards the rest position.

The present invention reaches the set objects.

In particular, the present invention allows a joining device 1 to be obtained with a reduced diameter (preferably 8 millimetres) without having to realise components inside the joint with excessively small dimensions and therefore subject to wear. In fact, the present invention has a cam element 4 with an outer profile having a single stroke for moving both expandable portions so as to simplify the mechanical structure.

Furthermore, the present invention also allows a return to rest position to be performed through a further profile of the same lobe 18 of the cam element 4 configured to push the tie-rod 3 towards the rest position.

Also worthy of note is that the present invention is relatively easy to realise and also that the cost connected to the implementation of the invention is not very high.

The invention claimed is:

1. A joining device between components of an item of furniture, comprising:

a casing extending along a longitudinal axis between a first end to be received in a first seat in a first component of said item of furniture, and a second end to be received in a second seat in a second component of said item of furniture, said casing comprising a first portion and a second portion which are each radially expandable for engaging the first and second components of the item of furniture at the first seat and at the second seat, respectively;

a tie-rod housed within the casing and axially slidable from a rest position, in which said first and second portions are radially retracted, to a locking position in which said first and second portions are radially expanded beyond dimensions of the casing in the rest position; said tie-rod having a first enlargement and a second enlargement respectively at said first and second portions to perform the radial expansion of said first and second portions; said tie-rod comprising a head arranged at one end of the tie-rod opposite the first and second enlargements; and a cam element housed in said casing to be rotatable with respect to the casing about an axis of rotation of the cam element while being fixed with respect to the casing along the longitudinal axis, the cam element operatively associated with an abutment portion of said tie-rod for axially moving the tie-rod from the rest position to the locking position and vice versa when said cam element is turned about the axis of rotation that is transverse with respect to an axis of the tie-rod;

wherein said cam element includes a lobe along an outer periphery, which has a forward profile having a predefined extension about the axis of rotation to perform, alone, displacement of the tie-rod with respect to the casing from the rest position to the locking position to actuate expansion of both first and second portions with a single movement in a forward rotation direction of the cam element;

wherein the head of the tie-rod has a slot extending along the axis of the tie-rod and said cam element comprises a through pin passing through said slot; said through pin having a fixing end which is opposite to a remainder of the cam element; and the casing having a hole in which the fixing end is inserted, the cam element being slidably engaged with the slot for realizing said displacement of the tie-rod;

said abutment portion of the tie-rod being arranged:

at said head;

externally of said slot; and extending outward from a boundary edge of the slot in a direction parallel to the axis of rotation to have an overall thickness, including a thickness of the head at the slot, greater than a thickness of the slot, to engage the cam element for causing said displacement of the tie-rod.

2. The joining device according to claim 1, wherein the slot has a rectilinear extension along the axis of the tie-rod.

3. The joining device according to claim 1, wherein the cam element is arranged at said head and is interposed between said abutment portion and a remaining portion of the tie-rod considering the longitudinal axis of the casing.

4. The joining device according to claim 1, wherein said abutment portion is substantially centered with respect to the axis of the tie-rod to promote an axial sliding movement of the tie-rod with respect to the casing.

5. The joining device according to claim 1, wherein said forward profile ends with a top and has a consecutive hollow adapted to receive the abutment portion to define the locking position.

6. The joining device according to claim 1, and further comprising a mechanical stop configured for stopping the cam element with respect to the tie-rod in the locking position in which said mechanical stop is separate from said forward profile.

7. The joining device according to claim 6, wherein said mechanical stop comprises a stop tooth positioned on the outer periphery of said cam element and a stop element positioned on the tie-rod at a position of the stop tooth during the locking position.

8. The joining device according to claim 7, wherein the stop element is defined by a seat positioned on a joining portion of the tie-rod with respect to the head.

9. The joining device according to claim 1, wherein said cam element has a return profile positioned along the outer periphery of said cam element and angularly offset with respect to the forward profile; said return profile being operatively associated with a further abutment portion positioned on the tie-rod for moving the tie-rod by contact from the locking position towards the rest position when said cam element is rotated in a return rotation direction opposite to the forward rotation direction.

10. The joining device according to claim 9, wherein said further abutment portion is defined by a joining portion of the tie-rod with respect to the head.

11. The joining device according to claim 9, wherein the cam element has a single lobe including both said forward and return profiles.

12. The joining device according to claim 1, wherein a portion of the casing surrounding said hole is solid and reinforced to keep the pin stable.

13. The joining device according to claim 1, wherein the cam element comprises an upper cam element and a lower cam element, respectively arranged on opposite sides with respect to the head of the tie-rod and respectively connected to opposite ends of said through pin; said tie-rod comprising upper and lower abutment portions arranged on opposite sides of the head of the tie-rod to respectively engage the upper and lower cam elements.

14. The joining device according to claim 13, wherein the upper cam element is arranged at a side accessible by a tool for turning the cam element and is made of a more resistant material with respect to the lower cam element which is made of a same material as the lower abutment portion against which the lower cam element is engaged.

15. The joining device according to claim 13, wherein the lower cam element has larger radial dimensions along the outer periphery around the axis of rotation with respect to the upper cam element, so that the lower cam element works more against the lower abutment portion, with respect to the upper cam element, at least with reference to the forward profile.

16. The joining device according to claim 1, wherein the casing comprises two concave half-shells connected at a joining line transverse to the longitudinal axis so that the joining device only comprises four separate pieces to be assembled.

17. The joining device according to claim 1, wherein an outer diameter of the casing is 8 mm.

18. The joining device according to claim 1, wherein said second enlargement of the tie-rod arranged at the second portion comprises a plurality of radial shoulders distanced from each other along the longitudinal axis so as to define an alternation of apexes and grooves, wherein in said radially expanded condition each radial shoulder is engaged, in radial thrust, with the second portion to provide a prolonged expansion of said second portion that extends at least to said radial shoulders.

19. A joining device between components of an item of furniture, comprising:

a casing extending along a longitudinal axis between a first end to be received in a first seat in a first component of said item of furniture, and a second end to be received in a second seat in a second component of said item of furniture, said casing comprising a first portion and a second portion which are each radially expandable for engaging the first and second components of the item of furniture at the first seat and at the second seat, respectively;

a tie-rod housed within the casing and axially slidable from a rest position, in which said first and second portions are radially retracted, to a locking position in which said first and second portions are radially expanded beyond dimensions of the casing in the rest position; said tie-rod having a first enlargement and a second enlargement respectively at said first and second portions to perform the radial expansion of said first and second portions; said tie-rod comprising a head arranged at one end of the tie-rod opposite the first and second enlargements; and a cam element housed in said casing to be rotatable with respect to the casing about an axis of rotation of the cam element while being fixed with respect to the casing along the longitudinal axis, the cam element operatively associated with an abutment portion of said tie-rod for axially moving the tie-rod from the rest position to the locking position and vice versa when said cam element is turned about the axis of rotation that is transverse with respect to an axis of the tie-rod;

wherein said cam element includes a lobe along an outer periphery, which has a forward profile having a predefined extension about the axis of rotation to perform, alone, displacement of the tie-rod with respect to the casing from the rest position to the locking position to actuate expansion of both first and second portions with a single movement in a forward rotation direction of the cam element;

said abutment portion of the tie-rod being arranged at said head and extending from said head to oppose the cam element for causing said displacement of the tie-rod;

wherein the head of the tie-rod has a slot extending along the axis of the tie-rod and said cam element comprises a through pin passing through said slot; said through pin having a fixing end which is opposite to a remainder of the cam element; and the casing having a hole in which the fixing end is inserted;

wherein the cam element comprises an upper cam element and a lower cam element, respectively arranged on opposite sides with respect to the head of the tie-rod and respectively connected to opposite ends of said through pin; said tie-rod comprising upper and lower abutment portions arranged on opposite sides of the head of the tie-rod to respectively engage the upper and lower cam elements.

* * * * *